United States Patent

Varela

[11] 3,883,150
[45] May 13, 1975

[54] GOLF CLUB CARRIER
[76] Inventor: Arthur A. Varela, 2207 Belle Haven Rd., Alexandria, Va. 22307
[22] Filed: Dec. 5, 1972
[21] Appl. No.: 312,280

[52] U.S. Cl. ........ 280/47.19; 150/1.5 R; 150/1.5 B; 280/DIG. 6
[51] Int. Cl. ............................................. B62b 1/12
[58] Field of Search ........ 280/47, 19, 47.2, DIG. 6; 150/1.5 R, 1.5 B

[56] References Cited
UNITED STATES PATENTS

| | | | |
|---|---|---|---|
| 2,559,951 | 7/1951 | Dunbar et al. | 280/DIG. 6 |
| 2,602,676 | 7/1952 | Fieldhouse | 280/DIG. 6 |
| 2,857,168 | 10/1958 | Neaverson et al. | 280/DIG. 6 |
| 2,921,797 | 1/1960 | Berglund et al. | 280/DIG. 6 |
| 2,992,012 | 7/1961 | Herold | 280/47.19 |
| 3,164,185 | 1/1965 | Ingoldt | 150/1.5 R |
| 3,172,681 | 3/1965 | Moses | 280/47.19 |
| 3,195,844 | 7/1965 | Roepke | 150/1.5 B X |
| 3,353,838 | 11/1967 | Schmid | 280/47.19 |
| 3,459,434 | 8/1969 | Dulaney | 280/DIG. 6 |

*Primary Examiner*—Robert J. Spar
*Assistant Examiner*—L. J. Paperner

[57] ABSTRACT

An elongated golf club carrier has wheels close to the center of gravity of the loaded unit and protruding from the bottom longitudinal side of the carrier body. A handle extends forwardly from the front end of the body beyond the heads of the golf clubs protruding from the body. A pivotable stand at the bottom side of the body normally is latched in a compact storage position but swings automatically to an active position when the front end of the carrier is raised off the ground. A shoulder strap is fixed to the top longitudinal side of the body so the carrier may be handled like a golf bag when desired.

15 Claims, 13 Drawing Figures

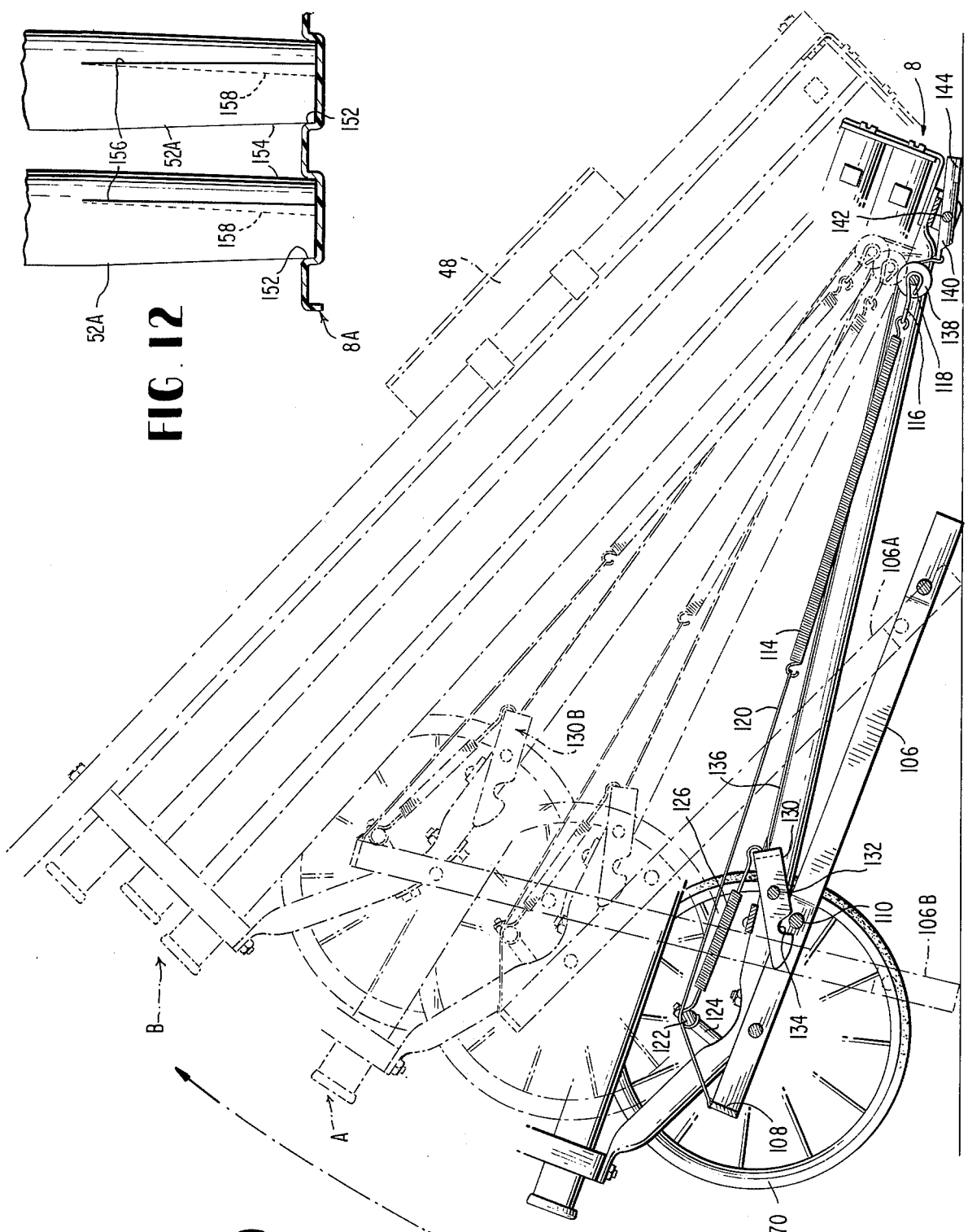

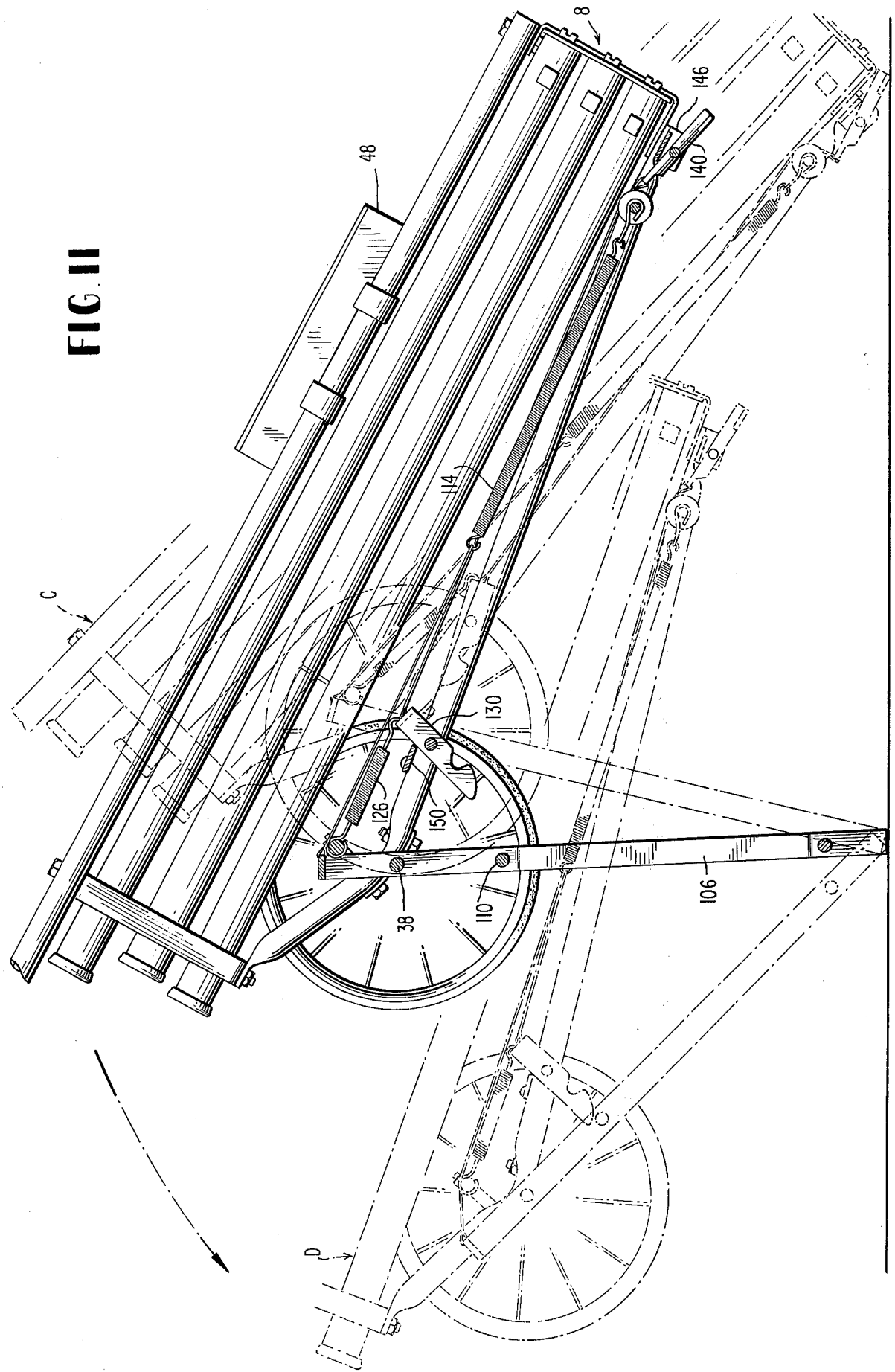

GOLF CLUB CARRIER

BACKGROUND OF THE INVENTION

This invention relates to carriers for golf clubs and is concerned particularly with carriers suitable for convenient handling by the golfer himself.

It ordinarily is desirable that a golfer have at his disposal a variety of different golf clubs as he moves about the course. The clubs of a set differ from each other in various ways, and having a full set available enables the golfer to select for each stroke the particular club characteristics best suited to the specific task at hand. However, there are a number of problems associated with keeping a full set of clubs conveniently available to the golfer as he moves about the course. For example, the clubs should be organized so as to facilitate club selection by the golfer and they should be held in such a way as to minimize club damage. Also the physical labor associated with the transport of the clubs must be held at a reasonably low level.

The problem of minimizing physical labor has become more acute in recent times. The once plentiful supply of persons willing to assist golfers in the capacity of caddies no longer exists. A caddy normally was expected to carry the golfer's clubs in a bag and to present the set of clubs to the golfer prior to each shot or stroke so that the golfer might make an appropriate club selection. This relieved the golfer himself from the strains associated with the transport of the clubs. However, the economic conditions which prevail at the present time make caddying relatively unattractive, and the golfer can no longer count on being able to obtain adequate caddying services at most golf courses.

In order to spare the golfer from excessive strains associated with the transport of his clubs, various forms of carts have been devised and many of them have been used with some success. Carts intended or adapted to be pulled along on wheels by the golfer have particularly wide appeal. These pull-type carts are sufficiently inexpensive to be within the reach of nearly all golfers and they do not interfer seriously with the activities conventionally associated with the playing of golf.

Most pull-type carts are intended to support conventional golf bags. The bags themselves may be provided with separators or the like to facilitate in organizing the clubs, and the carts are adapted to support the bags in a generally vertical orientation with the club heads protruding from the open top of the bag. A golf cart of this type normally will be provided with a pair of wheels, and when the cart is in use, the wheels will be spaced widely from each other to provide the lateral stability needed to prevent tipping of the loaded cart-bag assembly. Where the intended manner of handling and storing the cart during periods when it is not in use do not demand compactness, the cart wheels may be fixedly mounted in their widely spaced positions. It is more customary, however, for an individual golfer to use a foldable cart which permits the wheels to be brought together for compact storage or extended for lateral stability during use of the cart.

Although these foldable carts for carrying conventional golf bags are in extensive use at the present time, they are subject to a number of disadvantages. The practical constructions rugged enough to be truly satisfactory from the standpoint of structural integrity are relatively heavy. The added weight not only increases the work involved in pulling the cart up hills and the like but also makes the cart-bag assembly difficult to lift on the occasions when such action becomes necessary.

Another form of pull-type cart which has met with some success in recent years is one intended to eliminate the need for a golf bag. In a typical construction of this type, a wheeled carrier is provided with means for supporting the golf clubs with the heads of the clubs directed downwardly. This, of course, is the reverse of the arrangement provided by the ordinary golf bag. The reversal is desirable from the standpoint of lowering the center of gravity of the loaded carrier but it increases the difficulties associated with club identification because the club identifying indicia, typically numbers, are located on the soles or bottom faces of the club heads. Additionally, it is difficult to provide for supporting in a compact arrangement the clubs of a full set with the heads extending downwardly, and these carts designed for carrying clubs with the heads directed downwardly tend to be too wide for convenient carrying or storage in standard size lockers.

SUMMARY OF THE INVENTION

It is an object of the present invention to provide a novel golf club carrier which will not be subject to the objections and disadvantages noted in connection with the carriers available heretofore.

A more particular object of this invention is to provide a carrier adapted to be operated in the fashion of a pull-type cart but handled like a golf bag.

Another object of the invention is to provide a golf club carrier with a pair of wheels fixed in position thereon but so arranged as to minimize difficulties in manual handling and in storage of the carrier.

Still another object of the invention is to provide a carrier constructed so as to support the golf clubs of a set in such a manner as to minimize the likelihood of accidental displacement of individual clubs during handling of the carrier.

Yet another object of the invention is to provide a pull-type golf club carrier with stand means, preferably operating automatically, for supporting the carrier in a position which facilitates both selection and withdrawal or insertion of individual clubs by the golfer.

In accordance with the invention the foregoing objects are realized in a carrier made up of a club shaft receiving body having thereon a base upon which the carrier may be rested during storage, with the club heads protruding upwardly from the carrier, shoulder strap means by which the carrier may be transported in the fashion of a golf bag, and wheel means for permitting the carrier to be rolled along in the fashion of a pull-type golf cart.

In a preferred form of the invention, the club shaft supporting body has a pair of wheels protruding a short distance from a bottom longitudinal side thereof at a location close to the center of gravity of the loaded carrier. This permits the wheels to be closely spaced with respect to each other without giving the carrier a tendency to tip laterally when rolled along the side of a hill. The close spacing between the wheels is highly advantageous from the standpoint of compactness for storage and also from the standpoint from minimizing awkardness associated with manual lifting and carrying of the unit. The shoulder strap means is connected at its ends to the top longitudinal side of the body of the carrier at locations spaced on opposite sides longitudinally of the center of gravity of the loaded unit. This arrangement permits the carrier to be handled in the fashion of a golf bag when it becomes desirable to carry the unit over rough terrain or through areas in proximity to greens where the use of wheeled carts might damage the turf. In a particularly preferred form of the invention, the shoulder strap may be connected at one end to the top of the body of the carrier at a location offset laterally from the longitudinal center of the body, so that when the carrier is suspended by the shoulder strap, it will cant in a transverse direction to swing wheels away from the person carrying the unit.

Since the wheels of the carrier are located relatively close to its open end from which the club heads protrude, the body of the carrier will be disposed in a generally horizontal orientation when the carrier is being pulled along on the wheels. In order that the pulling action may be conveniently accomplished, the carrier is provided with a handle element extending longitudinally forwardly and upwardly from the body of the carrier. It is preferred that this handle element be pivotally secured to a longitudinally extending member at the top surface of the body and that means be provided for locking the handle either in a storage position thereof in which the handle extends back toward the base of the carrier or in an active pulling position thereof in which the handle protrudes forwardly and upwardly from the opposite end of the body into position for convenient manipulation by the user of the cart.

In accordance with another aspect of the invention, the carrier is provided with a stand for supporting the body of the carrier during intervals when movement of the carrier is not required. The stand preferably is mounted for pivotal movement about a transverse axis between a storage position in which it extends generally along the bottom side of the body of the carrier in a compact relationship therewith and an active position in which it protrudes beyond the wheels. When the stand is in this active position, the body of the carrier is supported by the stand and by the base so as to give the body an inclination sufficient to present the club heads at a level which permits convenient club selection. The inclination of the body also facilitates the removal and subsequent reinsertion of the selected clubs from the carrier.

The stand preferably is automatically operable. In one form of the invention, the stand is biased toward its active position and automatically operating latch means are provided for holding the stand in its storage position when the carrier is being pulled along on its wheels. The latch means may be released automatically by raising the front end of the carrier off the ground through the action of a trip device located near the base of the unit. The overall arrangement is such that the folding of the carrier stand from its active position to its storage position and automatic reengagement of the latch means may be accomplished by a simple forward pull on the handle of the carrier. As the carrier is pulled forwardly, the stand swings about its transversely located axis to its storage position, the carrier is lowered onto the wheels of the unit and the trip device is removed from engagement with the ground so as to permit reengagement of the latch means.

The trip device also may be released from engagement with the ground when the body of the carrier is moved to its full upright position in which it extends vertically from and is supported on the base. This permits the latch to be reengaged manually with the stand to hold the stand in its inactive position when the unit is to be stored or otherwise handled in the fashion of a conventional golf bag. For example, the carrier of this invention is adapted when its handle and stand are disposed in their inactive positions to be stored in a small locker or placed in the trunk of an automobile. The carrier also may be readily positioned on the conventional motorized riding carts used by some golfers to transport conventional golf bags during play.

Yet another feature of the carrier of this invention is that the individual golf clubs are restrained against accidental displacement from the body of the carrier. In a preferred form the body includes individual tubes for receiving the golf club shafts and means are provided near the base for frictionally engaging the ends of the shafts. The frictional engagement is sufficient to prevent a golf club from falling out of its tube when the carrier is inverted slightly to being rolled on its wheels down an incline and it preferably also is sufficient to prevent the clubs from falling from their tubes on the occasions of more severe inversions which sometimes occur when a golf club carrier is being manipulated in some unusual way such for example as might be required in positioning a loaded carrier in the trunk of an automobile. The frictional engagement, however, is not a serious impediment to intentional withdrawal of the club from the body of a carrier. When a club head is gripped manually and a pulling force is applied to the club, the frictional force exerted against the opposite end of the club shaft is readily overcome by the golfer.

A more complete understanding of these and other features and advantages of the present invention will become apparent from a careful consideration of the following detailed description of certain embodiments illustrated in the accompanying drawings.

BRIEF DESCRIPTION OF THE DRAWINGS

FIG. 10 diagrammatically illustrates in side elevation a sequence of positions assumed by various elements of the carrier of FIG. 1 as the carrier is being moved from the position of FIG. 1 to the position of FIG. 2.

FIG. 11 is a view similar to FIG. 10 but showing a sequence of positions assumed as the carrier is being returned from its club-selection position of FIG. 2 to its pulling position depicted in FIG. 1.

FIG. 12 is a detail view illustrating another form of means for frictionally engaging the club shafts, which means may be used in lieu of that shown in FIG. 8.

DETAILED DESCRIPTION OF ILLUSTRATED EMBODIMENT(S)

Figure 1:
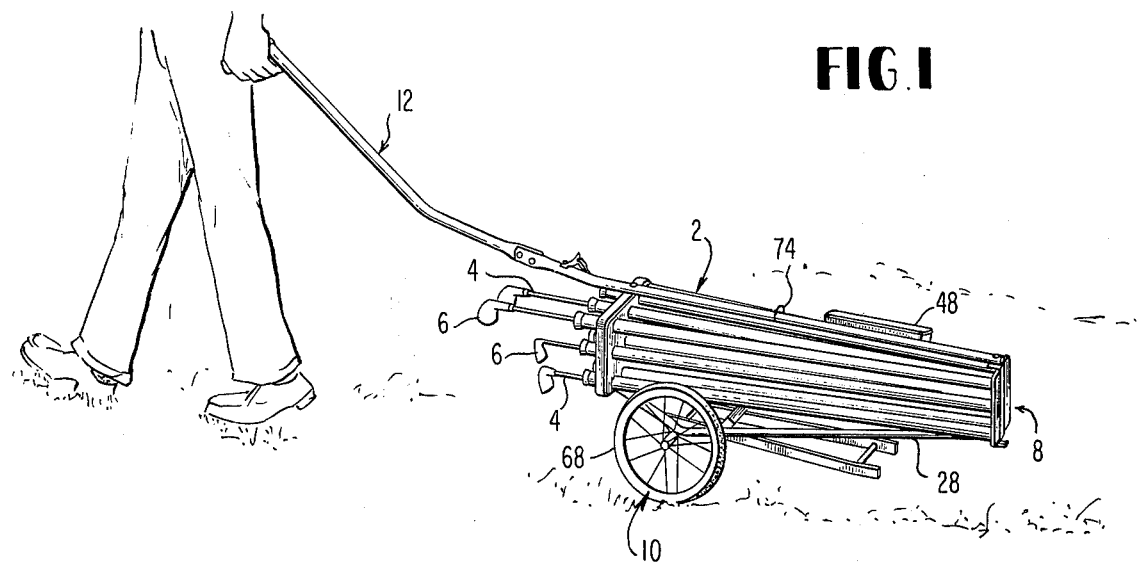
FIG. 1 is a pictorial perspective view showing a golf club carrier according to the present invention being pulled along by a golfer in the fashion of a pull-type golf cart.
Figure 2:
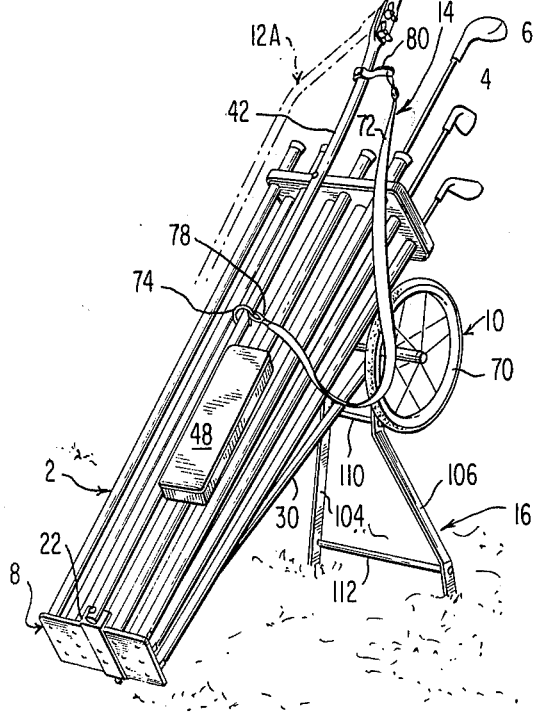
FIG. 2 is a perspective view of the carrier of FIG. 1 but showing the stand thereof in an active position for supporting the body of the carrier at an inclination which permits convenient club selection.
Figure 3:
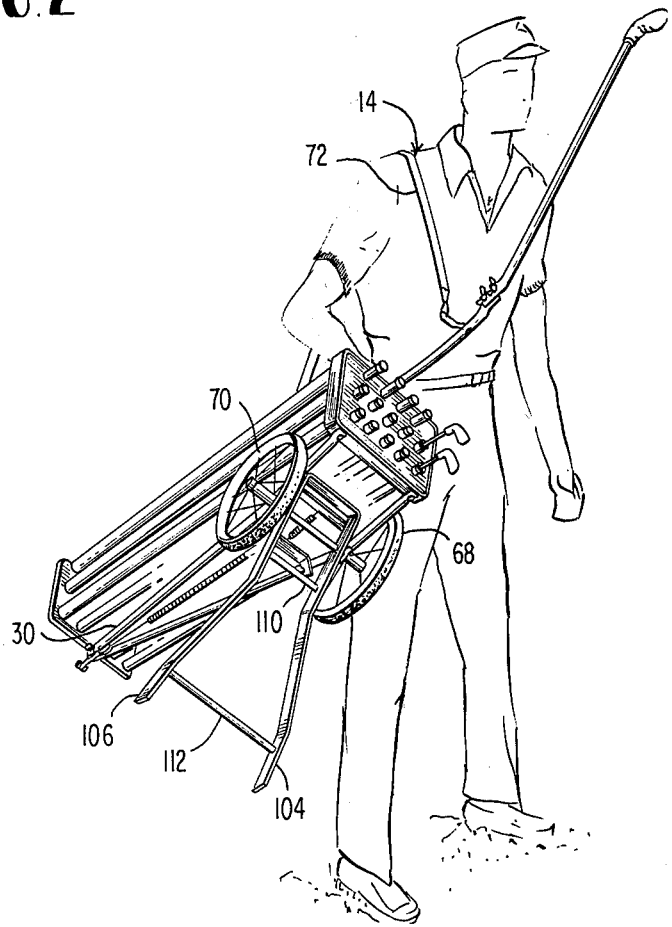
FIG. 3 is another pictorial perspective view showing the carrier of FIG. 1 suspended by a shoulder strap in a manner comparable to that employed in connection with the transport of conventional golf bags.

The organization and arrangement of the major components of a carrier constructed in accordance with the invention will be evident from FIGS. 1, 2 and 3 of the drawing. The carrier includes body means 2 for receiving the shafts 4 of the golf clubs of a set with the heads 6 of the clubs protruding from the open front end of the body means. The rear end of the body means 2 is provided with a base 8 upon which the carrier may be supported with the club shafts 4 extending in a generally vertical direction when it is desired to store the carrier in a conventional locker or the like. Wheel means 10 protrude beyond the bottom longitudinal side of the body means 2 and permit the carrier to be pulled along by handle means 12 as depicted in FIG. 1 in the fashion of a pull-type cart. When it is preferred, however, the carrier may be transported as depicted in FIG. 3 in the fashion of a conventional golf bag, being suspended by shoulder strap means 14 connected to the top longitudinal side of the body means 2. Stand means 16 also are connected to the body means 2 for cooperation with the base 8 to provide a stable support system for holding the carrier as depicted in FIG. 2 at an inclination permitting convenient club selection by the golfer.

The various features of the body means 2 of the illustrated embodiment are best shown in FIGS. 4 through 8 of the drawings. The base 8 includes a U-shaped strap 18 of some suitable material such as aluminum capable of providing strength and rigidity characteristics to the rear end portion of the carrier. The strap 18 has its midportion secured to the rear face of a larger plate or panel 20 of sufficient area to accommodate the free ends of the shafts of a full set of golf clubs. This panel 20 may be formed from fiberboard if desired.

The end portion 22 of the U-shaped strap 18 extending forwardly a short distance along the bottom longitudinal side of the carrier has rigidly connected thereto the flattened end portions 24 and 26 of a pair of frame tubes 28 and 30. The forward ends of these frame members 28 and 30 are rigidly connected by means 32 to a front support unit preferably made up of a rigid metal rim member 34 and a lightweight panel 36 fixed to the rim. The portions of the frame tubes 28 and 30 between their fixed ends are configured to provide for the proper support of an axle 38 for the wheel means 10. In particular it will be observed that axle brackets 40 are carried by the frame tubes 28 and 30 at locations near the front of the carrier.

Figure 4A:
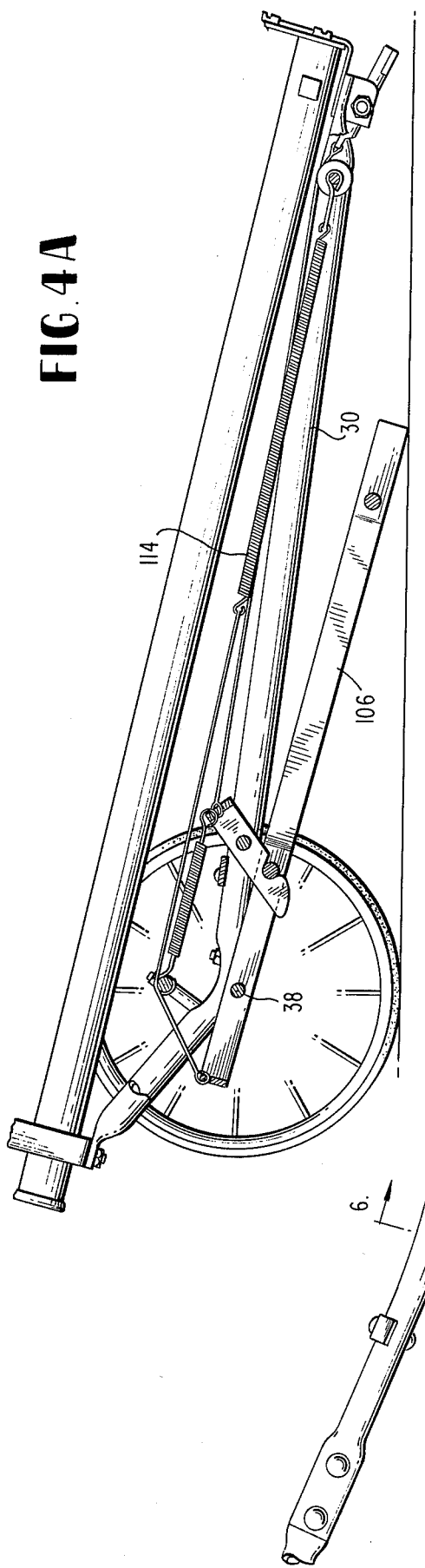
FIG. 4A is a vertical cross sectional view generally similar to FIG. 4 but taken along a vertical plane closer to the center of the carrier.
Figure 4:
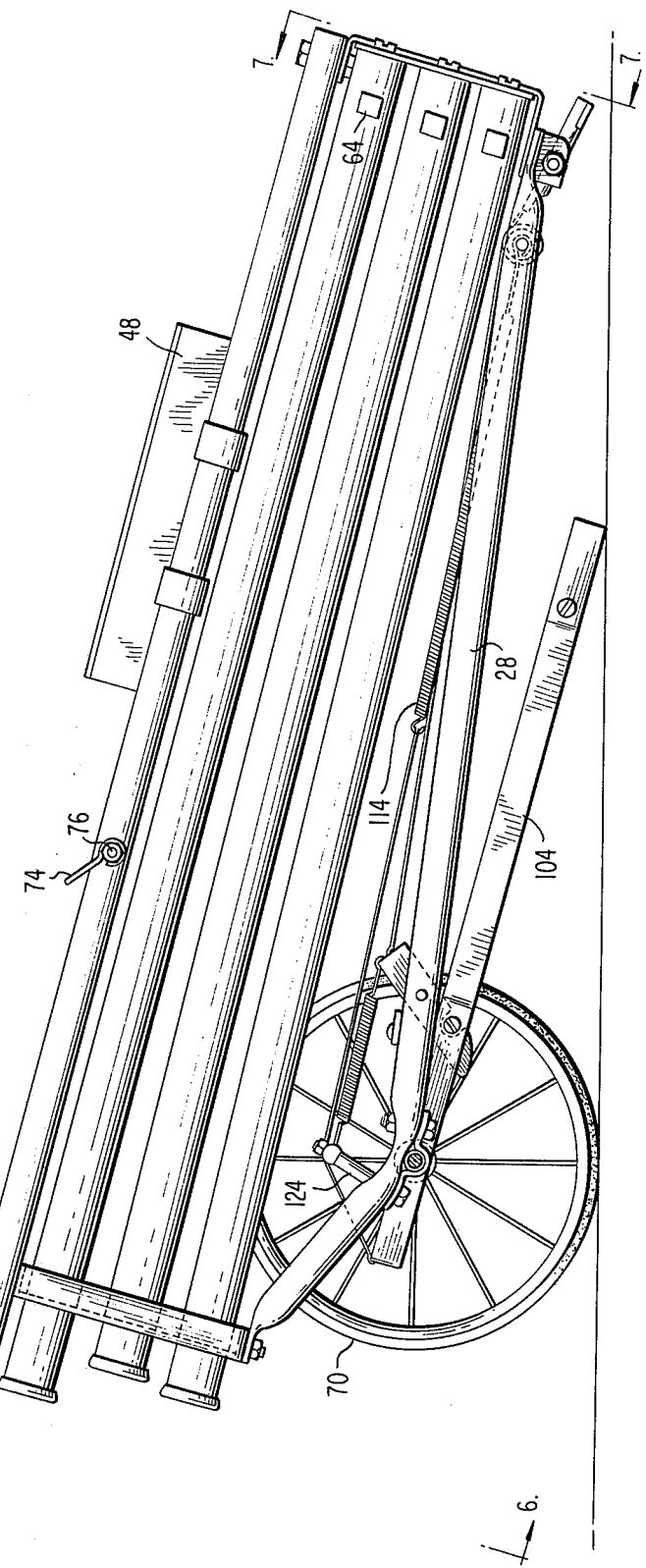
FIG. 4 is a side elevational view, on an enlarged scale, of the carrier shown in FIG. 1, the wheel of the carrier closest to the viewer having been omitted in the interests of clarity of illustration of certain parts disposed between the two wheels of the carrier.
Figure 5:
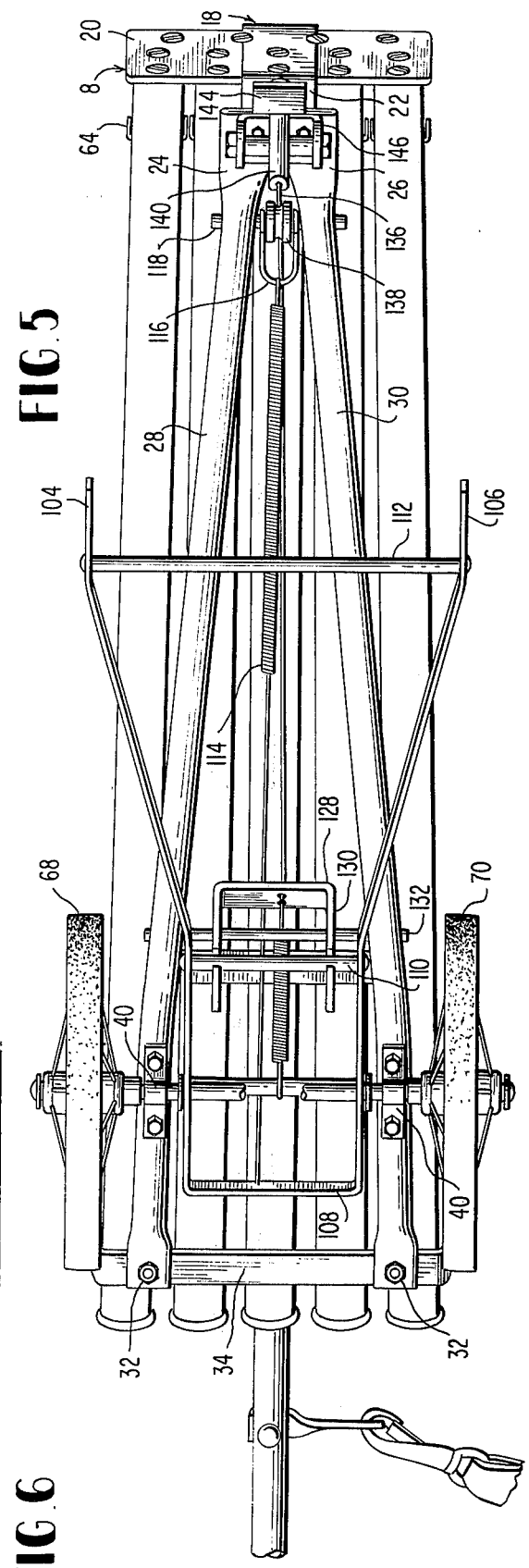
FIG. 5 is a bottom plan view of the carrier of FIG. 4.

The divergence of the members 28 and 30 from the center line of the carrier, as shown in FIG. 5, permits the axle brackets 40 to be spaced substantially from each other to enhance the rigidity of the mounting system for the axle 38, and the vertical inclinations of the portions of the members 28 and 30 in front of and behind the axle brackets, as shown in FIG. 4, serve to displace the axle 38 downwardly a short distance from the general level at which the golf clubs are held as the carrier is being pulled in the manner depicted in FIG. 1 of the drawings. This downward displacement of the axle 38 increases the clearance between the major portions of the body means 2 and the ground and enhances the capacity of the carrier to roll over irregular terrain.

A single framing tube 42 extends longitudinally along the middle of the top side of the carrier and is secured, as by bolt means 44 both to the top end 46 of the U-shaped strap 18 at the base of the body means and to the top side of the rim 34 of the support unit at the front end of the body means. This tube 42 constitutes a major strength and rigidity imparting component of the body means 2. In addition, the unobstructed arrangement of the forward portion of this tube 42 makes it convenient for the golfer to grasp this tube in his hand for the purpose of lifting the carrier, and the rear portion of the tube 42 provides a highly satisfactory site for the mounting of a ball and tee container 48 (FIGS. 1, 2, 4 and 11, for example).

Figure 6:
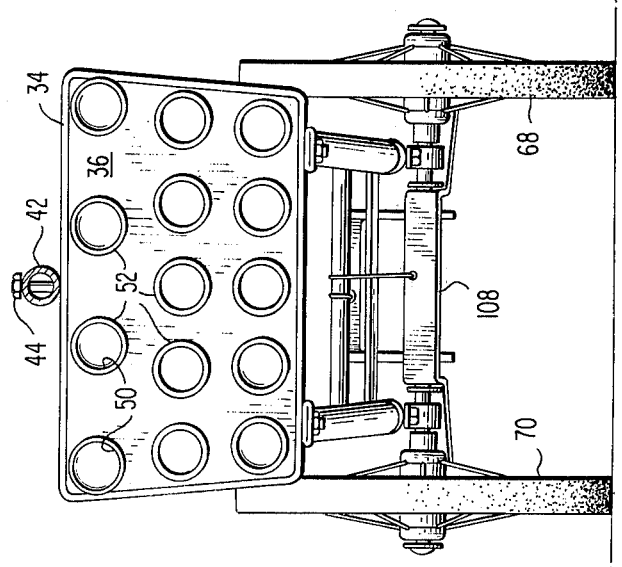
FIG. 6 is a cross sectional view taken along the line 6—6 in FIG. 4.

As perhaps best shown in FIG. 6, the panel member 36 of the front support unit is provided with fourteen holes 50 of circular configurations. Extending through each of these holes 50 is a club receiving tube 52. The particular arrangement shown in FIG. 6 is an especially desirable one. The two lower rows of five tubes each provide for the support of a full set of iron clubs and the top row of four tubes provides for the support of four wood clubs in spaced relation to the other clubs so that no covers or other devices are required in order to prevent injury to these clubs.

Figure 7:
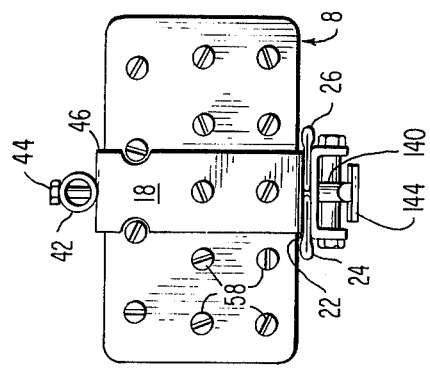
FIG. 7 is an end view taken along the line 7—7 in FIG. 4 and illustrating the base of the carrier.

It will be observed further in connection with FIG. 7 of the drawing that the spacing between the axes of adjacent tubes 52 is less at the rear end of the carrier than that shown in FIG. 6 with reference to the front end of the carrier. This causes the several tubes 52 to be disposed in a forwardly divergent relationship and thus aids in maintaining club head separation without unduly detracting from the compactness of the assembly.

Figure 8:
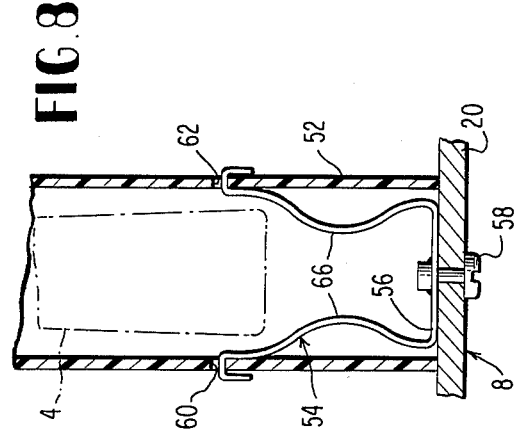
FIG. 8 is a detailed cross sectional view illustrating the base of the carrier, the adjacent end portion of one of the club-receiving tubes, and an associated spring clip for frictionally engaging the free end of a golf club shaft disposed in such tube.

FIG. 8 illustrates the structural details at the rear end of one of the club receiving tubes 42, and it will be understood that similar features may be provided in connection with each of the other tubes 52. In this embodiment a spring metal clip 54 near the rear end of each tube 52 serves not only as means by which the rear end portion of the tube 52 may be secured with respect to the base 8 of the carrier but also as means for frictionally engaging the free end of a golf club shaft inserted into the tube to restrain the shaft against unintended longitudinal movement relative to the tube.

Each clip 54 has a flat central portion 56 butted against the base panel 20 and secured thereto by suitable means such as a bolt 58. Near each of its ends the clip 54 has a laterally extending portion 60 adapted to pass through a slit 62 in the wall of the club receiving tube 52, and the protruding ends 64 of the clip 54 are bent rearwardly along the exterior of the tube 52 to complete the assembly. It will be observed that this construction prevents substantial longitudinal movements of the tube 52 relative to the base 8. Although the slits illustrated in FIG. 8 are somewhat enlarged in the interest of clarity, it will be understood that these slits may, if desired, be so configured as to provide close fits with the laterally extending portions 60 of the clips.

The individual tubes 52 usually will be formed from polyethylene or some other suitable plastic. It is to be expected that the resistance offered by the interior of such a tube to longitudinal movements of the club shaft 4 therein will not be great. In order that the clubs may be retained in place in the tubes and not slide forwardly when the carrier is pulled down a hill for example, it is desirable that means be provided for frictionally engaging the free end portion of each of the club shafts 4. As shown in FIG. 8, the clips 54 serve admirably for this purpose. Each clip has inwardly bowed side wall portions 66 on opposite sides thereof. These bowed portions 66 are of course flexible, and when the end of a club shaft 4 is forced rearwardly from the position indicated in FIG. 8 to the end of its path of travel within its tube 52, the bowed portions 66 on opposite sides of the clip 54 will be repositioned to bear frictionally against opposite sides of the end portion of the club shaft.

It should perhaps be noted in passing that the free end portion of each golf club shaft is the handle or grip end of the shaft. Many golf club handles are provided with flattened zones designed to assist the golfer in aligning the face of the club head. It has been found that the illustrated orientation of the clips 54 with their ends diverging laterally is well suited to the accommodation of clubs having flattened grip portions. With this arrangement, the club heads hang down naturally as suggested in FIG. 1 of the drawings when the bowed portions 66 of the clips are in engagement with the free end portions of the clubs.

The heads 6 of the individual golf clubs have considerable weight and the center of gravity of each club can be expected to be much closer to the head than to the grip end. It follows that, in a lightweight carrier, the center of gravity of the loaded carrier assembly will be displaced a very substantial distance longitudinally from the base of the unit. The present invention takes this fact into account in locating the wheel axle 38 as indicated in the drawings.

In the position shown in FIG. 1, the wheel axle 38 should be just a short longitudinal distance behind the center of gravity of the loaded carrier. This arrangement essentially balances the load but provides a slight downward pressure on the golfer's hand as he walks along pulling the carrier.

The location of the wheel axle 38 close to the center of gravity of the loaded carrier also makes it possible to minimize the lateral spacing between the two wheels 68 and 70 which are rotatably mounted upon the ends of the axle 38. As shown in the drawings, these wheels 68 and 70 are spaced apart from each other about the same distance as the width of the body means 2 of the carrier. This distance may be on the order of seven to nine inches, with the wheels themselves having diameters on the order of seven to nine inches. In general, it is desirable that the overall cross section of the carrier at the location of the wheels be as small as is consistent with ease of pulling of the carrier and stability against lateral tipping when the carrier is moved along the side of a hill or over irregular ground. With respect to lateral stability, it generally will be found that adequate stability against tipping can be obtained if a line between the center of gravity of the loaded carrier and the tread of one of the wheels intersects a line from the center of gravity to the other of the wheels at an angle of at least about 50°; and this criterion may be used in establishing dimensional relationships for optimizing performance characteristics of carriers constructed in accordance with certain aspects of the present invention.

The strap means 14 of the illustrated carrier are located on the side opposite the wheel means 10. A flexible strap 72 is connected at its rear end to a bail 74 mounted by suitable means 76 such as bolts on the longitudinally extending top frame member 42 of the body means 2. A spring clip 78 provides a convenient means for attaching the rear end of the flexible strap element 72 to the bail 74. As its forward end the strap 72 is flexibly connected to the laterally protruding end of a bracket 80 fixed on a front end portion of the longitudinally extending top element 42 of the body of the carrier. As shown in FIG. 2, the bracket 80 extends to the right of the longitudinal axis of the carrier. This arrangement is preferred for a golfer who carries his clubs on his right shoulder, because as indicated in FIG. 3 of the drawings, the lateral displacement of the front suspension point for the strap means 14 causes the body of the carrier to cant laterally and swing the wheels 68 and 70 outwardly in a direction so as to minimize contact with the golfer. The bracket 80 should protrude laterally in the opposite direction when a carrier in accordance with the invention is to be used by a golfer who prefers to carry his clubs over his left shoulder. This result may be accomplished for example by providing a detachable connection between the bracket 80 and the frame member 42, so that the user himself may see to it that the bracket is oriented properly to suit the user.

The handle means 12 of the carrier is connected to the front end of the top frame member 42 of the body means at a location beyond the bracket 80. Forwardly from the connection, the handle means 12 is bent slightly upwardly at 82, and it terminates in a grip piece 84 preferably molded to conform generally to the configuration of the golfer's hand. The grip piece 84 is rigidly connected to the handle 12 and may be used to apply turning forces to the carrier as well as simple pulling and lifting forces.

Figure 9:
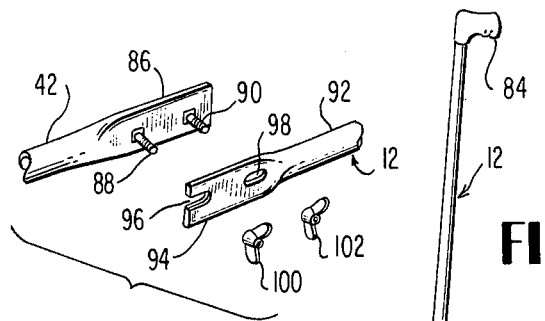
FIG. 9 is an exploded perspective view illustrating details of a preferred connection between the handle and a longitudinally extending member on the top of the body of the carrier of FIG. 1.

Referring particularly to FIG. 9 it will be seen that the front end of the framing tube 42 at the top of the body means 2 is falttened at 86 and has a pair of laterally extending screws 88 and 90 fixed thereto. The main body of the handle 12 also is constituted by a tubular member 92 and the rear end portion thereof is flattened as indicated at 94. The extreme rear end of the flattened portion 94 of the handle tube 92 is provided with an open ended slot 96 for receiving the screw 88. Another slot 98 is located forwardly of the open ended slot 96 in position to receive the laterally extending screw 90. Wing nuts 100 and 102 may be screwed onto the ends of the screws 88 and 90 to clamp together the flattened portions 86 and 94 of the tubes 82 and 92. With this arrangement, it becomes an easy matter to locate and fix the handle 12 either in its forwardly protruding pulling position shown in FIG. 1 and in full lines in FIG. 2, or in its rearwardly extending storage position indicated in FIG. 2 by the broken lines 12A. In order to move the handle 12 from its full line position to its broken line positions, all that need be done is to losen the wing nuts 100 and 102, shift the handle 12 forward far enough to free the open ended slot 96 from the rear screw 88, pivot the handle 12 about the screw 90, and then retighten the wing nut 102 to hold the handle in its rearwardly extending storage position. It will be noted that in this position, the handle occupies a compact relationship with respect to the body means 2 of the carrier and does not detract from the adaptability of the carrier for storage in a restricted space.

The stand means 16 includes leg portions 104 and 106 pivotally mounted on the wheel axle 38 and a transversely extending connector portion 108 at the inner ends of the leg portions. The legs 104 and 106 also are connected together by spacer bolts 110 and 112 or other appropriate means located respectively on the side of the axle 38 opposite the connector 108 and near the free outer ends of the legs to provide a rugged but lightweight structure.

The stand normally is biased toward its active position depicted in FIG. 2 by a coil spring 114. This spring is rather long so that substantial amounts of movement may occur without removing the biasing force offered by the spring. The rear end of the spring 114 is fixed with respect to the body means 2 of the carrier through a bail 116 carried by a transverse shaft 118 fixed in place on rear end portions of the lower tubular frame members 28 and 30 of the body. A flexible cord 120 connects the front end of the long coil spring to the connector portion 108 of the stand means. Intermediate its ends the cord 120 passes over a transversely extending bar 122 appropriately positioned to give the front end portion of the cord an inclination which permits a pull to be exerted effectively upon the stand tending to pivot it about the wheel axle 38. In this connection note the angle of the front end portion of the cord 120 in FIG. 10 as the cord passes over the bar 122 and leads to the connector portion 108 of the stand.

The bar 122 is fixed to the front end portions of the lower tubular frame members 28 and 30. This transversely extending bar 122 also serves as an end connection point for another spring 126. The opposite end of the spring 126 is connected to a latch 128 for holding the stand means 16 in its inactive position depicted in FIG. 1 of the drawings.

The latch 128 is generally U-shaped and includes a pair of side arms 130 pivotally mounted upon a transverse shaft 132 fixed at its ends to the lower tubular frame members 28 and 30 of the body means 2 of the carrier. At its free end each of the arms 130 is provided with a rounded nose and a notch 134 for engagement with the upper spacer bolt 110 connecting the legs 104 and 106 of the stand means together.

The spring 126 is arranged to pivot the latch 128 about the shaft 132 in a direction such as to cause engagement between the notches 134 and the spacer bolt 110. However, the rear end of the latch 128 is connected to a flexible cord 136 which leads rearwardly over a small pulley 138 on the transverse shaft 118 to the forward end of pivotally mounted trip device 140 for pivoting the latch against the bias of the spring 126. The trip device 140 may be a simple lever pivoted at 142 and carrying a ground engaging shoe 144 at its rear end. The pivot 142 preferably is carried by a bracket 146 fastened to the flattened rear end portions 24 and 26 of the lower frame members and to the strap 18 of the base of the unit.

The cooperation between the stand means, the latch means and the trip device in automatically controlling the orientation of the stand means relative to the body of the carrier is best illustrated in FIGS. 10 and 11 of the drawings.

FIG. 10 shows a sequence of positional relationships assumed by the parts as the carrier is moved from the pulling position shown in FIG. 1 to the club selection position shown in FIG. 2. The shift is accomplished by lifting upwardly on the handle means 12 to swing the body of the carrier upwardly about the base 8. As the wheels 68 and 70 are lifted upwardly off the ground, the shoe 144 at the rear end of the trip device 140 bears against the ground and causes relative movement between the trip device 140 and the body 2 of the carrier. As viewed in FIG. 10, this relative movement is a counterclockwise pivoting movement of the trip 140 about the axis 142.

The pivoting movement of the trip device 140 is transmitted through the cord 136 to the latch 128. As the cord 136 is pulled during movement of the trip 140 to the full line position in FIG. 10, the latch 128 will be pivoted against the bias of spring 126 in a clockwise direction to disengage the notches 134 in the arms of the latch from the spacer bolt 110 connecting the leg portions 104 and 106 of the stand means.

When the latch is released, the spring 114 becomes effective for pivoting the stand means about the wheel axle 38 in a clockwise direction as viewed in FIG. 10 of the drawings. This pivoting movement will be inhibited initially, however, by contact between the rear ground engaging ends of the stand legs 104 and 106 with the ground. However, continued lifting motion exerted upon the handle 12 of the carrier will permit continued relative swinging motion of the stand means about the wheel axle 38 as suggested in broken lines by the positions A and B in FIG. 10. The position designated B represents the end position for the clockwise swinging movement of the stand means about the wheel axle. In this position the front end portion of the stand means abuts against the stationary bar 122 fixed onto the underside of the body of the carrier. When the ends of the legs 104 and 106 of the stand are lowered into contact with the ground, they form with the base 8 a stable support for the carrier in the inclined club selection position depicted in FIG. 2 of the drawings. The carrier normally will remain in this position while the golfer selects an appropriate club, strokes the ball, and returns the selected club to the carrier.

When the golfer is ready to resume his movement along the course, he should grasp the handle 84 and apply to it downwardly and forwardly directed movements. Such movements have the results indicated in FIG. 11 where the broken line position designated C corresponds to the club selection position of FIG. 2 and where the full line position and the broken line position D illustrate subsequent stages in the collapsing of the carrier.

Initially, the base 8 is raised about the ground contacting ends of the legs 104 and 106 of the stand means, causing the carrier to assume the condition shown in full lines in FIG. 11. It will be observed that in this position the trip 140 has been allowed to swing clockwise from its release position (shown in full lines in FIG. 10) under the influence of the latch spring 126. The extent of latch movement accompanying the pivoting of the trip device 140 is limited by the length of the cord 136. However, in order to provide additional assurance that the latch will be positioned properly, it generally is preferable to provide a stop device 150 secured to the lower frame tubes 28 and 30 of the body of the carrier in position to limit counterclockwise swinging movement of the latch 128 under the influence of the latch spring 126. The stop 150 is positioned so that the free ends of the arms of the latch will present their rounded nose portions 152 for contact with the spacer bolt 110 when the stand means is pivoted about the wheel axle 38.

Upon continued forward pulling of the carrier by the golfer, the carrier will continue to swing about the ground engaging ends of the stand legs 104 and 106 as indicated by the broken line position D in FIG. 11. This causes the stand to pivot in a counterclockwise direction about the wheel axle 38 against the bias of its spring 114. As the wheels approach the ground, the pivoting movement of the stand about the wheel axle 38 will have proceeded to the point where the spacer bolt 110 may be engaged by the notches 134 in the arms of the latch means 128. Then, as the movement is continued, the weight of the carrier will be brought onto the wheels 68 and 70 and the stand will be latched in its inactive storage position depicted in FIG. 1 of the drawings. Thus, it will be seen that the whole transition from the club selection position to the pulling position proceeds smoothly and automatically with a minimum amount of attention from the golfer.

Although the stand means 16 normally will be operated automatically during use of the carrier on the golf course, it should be understood that manual operation of the stand folding and latching system can be effected when this is desired. If the stand means 16 is in its folded position extending back along the bottom side of the body of the carrier, it may be caused to assume its extended position merely by pressing on the shoe 144 carried by the trip device 140 at the rear end of the carrier. Movement of the trip device will serve to release the latch 128 and the stand will swing out far enough to bring the upper part of the stand into abutting relationship with respect to the bar 122 on the frame. The carrier may be placed on the ground as indicated in FIG. 2 or it may be carried over the golfer's shoulder as indicated in FIG. 3.

The stand means 16 also may be swung manually from its extended position to its storage position. In this connection it will be observed that the latch 128 will be capable of receiving and holding the stand means in its retracted position at all times when the trip device 140 is free of pressure on its rear end. Moreover, the spacial relationship between the rear end of the trip device 140 and the base 8 of the carrier is such that the carrier may be rested upon the base 8 in a vertical storage position without affecting the trip device 140. This vertical storage position is a desirable one when the carrier is to be stored in a conventional locker or the like. The same positional relationship often is desirable also when the carrier is to be mounted on a motorized riding cart designed for the transport of ordinary golf bags.

In addition to being simple to operate, the illustrated carrier has the important advantage that it can be assembled to provide a very lightweight product. For example, one embodiment weighs less than seven pounds. By way of contrast, the combination of an ordinary golf bag and a typical folding wheel cart might, for example, weigh about twenty-five pounds.

The lightness of the carrier gives extra significance to the structural features designed to facilitate carrying of the unit in the fashion of a golf bag when desired. The carrier of the invention in fact serves as a practical substitute for a bag in all the modes of use for which a bag has advantages over a conventional cart.

Of course, it will be realized that not all the features of the illustrated carrier must be used at all times. Alternative or substitute features are feasible in many instances. FIG. 12 illustrates by way of example another embodiment of the means of restraining the golf club shafts against unintended longitudinal removal from the carrier body.

In FIG. 12 the base of the carrier is designated 8A and two club shaft receiving tubes are designated 52A. It will be understood that the relation of these elements to other features of the carrier is similar to that which exists in connection with the corresponding elements 8 and 52 of the embodiment described above. However, the elements 8A and 52A cooperate with each other in a novel fashion.

The top face of the base 8A is provided with circular recesses 152 of diameters substantially less than the normal diameters of the tubes 52A, and the end portion 154 of the tubes 52A are reduced in size to fit in the recesses. In the illustrated embodiment, the desired size reduction in the end portion 154 of a club shaft receiving tube 52A is accomplished by slitting the tube at 156 and bringing one edge of the slit into overlapping relation to the other as shown at 158. The reduced end portions 154 of the tubes are cemented in place in their recesses 152 by an adhesive appropriate for the particular materials used.

With this construction, the longitudinally tapering inner wall surfaces of the rear end portions of the tubes bear frictionally against the club shafts to hold the shafts against accidental displacement. As an indication of the size relationships found suitable in this embodiment, it may be mentioned that the outside diameters of the tubes 52A may desirably be reduced from one and one-quarter inches to about one inch over the length of an eight inch long slit 156. This embodiment is somewhat simpler and less expensive than that illustrated in FIG. 8.

Still over modifications and variations of this and other aspects and features of the invention will suggest themselves to persons skilled in the art. It is intended therefore that the foregoing detailed descriptions be considered as exemplary only and that the scope of the invention be ascertained from the following claims.

What is claimed is:

1. A carrier in which a set of golf clubs can be stored compactly when not in use and transported when in use with the heads of the clubs protruding from the carrier to permit selection and withdrawal of individual clubs for use, said carrier comprising body means for supporting the shafts of said golf clubs, said body means being elongated in the direction of the lengths of the golf club shafts and having longitudinal ends and longitudinal sides, a base on one longitudinal end of said body means upon which said carrier may be rested during storage to dispose said body means in a generally vertical orientation, a pair of wheels on said body means rotatable about a generally transverse axis remote from said base and close to the center of gravity of the loaded carrier, the wheels of said pair extending beyond the longitudinal side of said body means which faces downwardly when said carrier is shifted to a generally horizontal orientation with said wheels being spaced laterally in opposite directions from the said center of gravity to stabilize the carrier against sidewise tipping when said body means is supported in a generally horizontal orientation by said wheels, and elongated handle means on the longitudinal side of said body means opposite said wheels, said handle means having along its length portions extending at angles with respect to each other so that said handle means protrudes longitudinally and upwardly from the end of said body means opposite said base when said body means is supported in a generally horizontal orientation by said wheels to dispose a free end portion of said handle means at a level for convenient manipulation by a person pulling the carrier along on said wheels with the said body means extending longitudinally close to the ground in a generally horizontal direction, the longitudinal protrusion of said handle from the last-mentioned end of said body means being sufficient to permit the person pulling the carrier to walk in front of the horizontally disposed carrier without contact with or interference from the carrier or the golf clubs therein.

2. A carrier according to claim 1 including shoulder strap means on the side of said body means opposite said wheels for permitting said carrier to be manually transported in the fashion of a golf bag.

3. A carrier according to claim 2 wherein said wheels of said pair are spaced laterally from each other a distance corresponding approximately to the width of said body means, and wherein said shoulder strap means is connected at its ends to said body means at locations spaced longitudinally on opposite sides of the center of gravity of the loaded carrier.

4. A carrier according to claim 3 wherein at least one end of said shoulder strap means is connected to said body means at a point spaced laterally from the longitudinal central axis at the top of the body means so as to cause said body means with said wheels depending therefrom to assume a canted position when suspended by said shoulder strap means to thereby minimize contact between said wheels and the body of the person supporting said carrier by said shoulder strap means.

5. A carrier according to claim 1 wherein said handle means includes an elongated member, pivotal mounting means for permitting movement of said elongated member between an active pulling position in which it extends beyond the end of said body means opposite said base and a storage position in which it extends back toward said base in compact overlying relation to the top of said body means, and means for locking said elongated member in a selected one of said positions.

6. A carrier according to claim 1 comprising means on said body means near said base for frictionally engaging the ends of the golf club shafts to restrain them against unintended longitudinal movement relative to said body means when the carrier is moved to lower the heads of the clubs beneath the opposite ends of the club shafts.

7. A carrier according to claim 6 wherein said body means includes a plurality of club-receiving tubes extending from said base to the opposite end of said body means, and wherein said means for frictionally engaging the ends of the golf club shafts includes spring clip means extending into the interior of each of said tubes near said base.

8. A carrier according to claim 7 wherein said spring clip means are fixed to both said base and said tubes to prevent displacement of said tubes relative to said base.

9. A carrier according to claim 1 comprising stand means mounted on said body means for pivoting movement about a transverse axis between a storage position in which said stand means extends generally longitudinally of said body means and an active position in which said stand means protrudes from said body means to cooperate with said base so as to support said body means at an inclination facilitating club selection and insertion and withdrawal of selected clubs.

10. A carrier according to claim 9 wherein the axis of rotation of said wheels is close to said transverse axis of pivoting movement of said stand means, and wherein said stand means extends away from said body means beyond said wheels in said active position of said stand means.

11. A carrier according to claim 1 wherein said body means includes a longitudinally extending member on the side thereof opposite said wheels adapted to be gripped manually for lifting said carrier, and wherein said handle means is adjustably connected to the end of said longitudinally extending member opposite said base for selective positioning of said handle means either in a storage position in which it extends back toward said base or in a pulling position in which it extends forwardly in the opposite direction.

12. A carrier for a set of golf clubs the heads of which protrude from the carrier to permit selection and withdrawal of individual clubs for use, said carrier comprising body means for supporting the shafts of said golf clubs, a base on said body means upon which said carrier may be rested during storage to dispose said shafts of the golf clubs in a generally vertical orientation, shoulder strap means on said body means for permitting said carrier to be manually transported in the fashion of a golf bag, stand means mounted on said body means for pivoting movement about a transverse axis between a storage position in which said stand means extends generally longitudinally of said body means and an active position in which said stand means protrudes from said body means to cooperate with said base so as to support said body means at an inclination facilitating club selection and insertion and withdrawal of selected clubs, and wheel means on said body means for permitting said carrier to be rolled along in the fashion of a pull-type golf cart and including a pair of wheels each of which rotates about a generally transverse axis close to said transverse axis of pivoting movement of said stand means, said stand means extending away from said body means beyond said wheel means in said active position of said stand means, biasing means for urging said stand means towards said active position, latch means for holding said stand means in said storage position, and latch operating means for releasing said latch means when the end of said carrier opposite said base is lifted to pivot the carrier on the base and raise said wheel means above the ground.

13. A carrier according to claim 12 comprising handle means extending longitudinally from the end of said body means opposite said base, said stand means being pivotable against the force of said biasing means from said active to said storage position when said carrier is pulled longitudinally by said handle means, and said latch operating means being automatically operable to reengage said latch means with said stand means as said wheel means are lowered onto the ground during such pivoting of said stand means.

14. A golf club carrier comprising longitudinally elongated body means for supporting the shafts of the golf clubs with the heads of the clubs protruding from one end thereof, a base on the longitudinal end of said body means opposite the end from which the club heads protrude, a pair of transversely spaced-apart wheels operatively connected to said body means for rotation about a transverse axis remote from said base and close to the center of gravity of the loaded carrier so that both of said wheels may contact the ground and stably support said body means against lateral tipping when said body means extends longitudinally in a generally horizontal direction, and stand means mounted on said body means for pivoting movement about an axis close to the axis of rotation of said wheels between a storage position in which said stand means extends generally longitudinally of said body means and an active position in which said stand means protrudes from said body means beyond said wheels to cooperate with said base so as to support said body means with said wheels in an elevated condition and with said body means disposed at an inclination facilitating club selection and insertion and withdrawal of selected clubs.

15. A carrier according to claim 14 wherein said body means includes a longitudinally extending member on the top side thereof adapted to be gripped manually for lifting said carrier, wherein said wheels protrude from the bottom side of said body means near the center of gravity of the loaded carrier, and wherein a handle is connected to the end of said longitudinally extending member opposite said base, said handle being movable between a storage position in which it extends back toward said base and a pulling position in which it extends forwardly in the opposite direction for convenient manipulation by a person pulling the carrier along on said wheel means with said body means extending longitudinally close to the ground in a generally horizontal direction.

* * * * *